Jan. 27, 1948. A. L. KINYON ET AL 2,434,933
TRANSMISSION LINE FLASHOVER DETECTOR
Filed March 26, 1945

Allen L. Kinyon   INVENTORS.
William E. Scarborough

BY *J. T. Mothershead*
   *Attorney.*

Patented Jan. 27, 1948

2,434,933

UNITED STATES PATENT OFFICE 2,434,933

TRANSMISSION LINE FLASHOVER DETECTOR

Allen L. Kinyon, Vancouver, Wash., and William E. Scarborough, Portland, Oreg., assignors to the United States of America, as represented by the Secretary of the Interior Application March 26, 1945, Serial No. 585,000

3 Claims. (Cl. 177—311)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

Our invention relates to a means for the detection of lightning flashovers from electrical transmission lines to the ground through one of a plurality of transmission line towers, and particularly to a means which may be mounted on a tower leg at a point readily accessible from the ground. With the aid of our invention a lineman may quickly determine through which tower, or towers, lightning flashovers have occurred since a previous inspection; then climb each tower where a flashover is detected to inspect the transmission line insulators and determine whether or not any have been damaged by the lightning flashover; thus facilitating prompt replacement or repairs.

Figure 1:
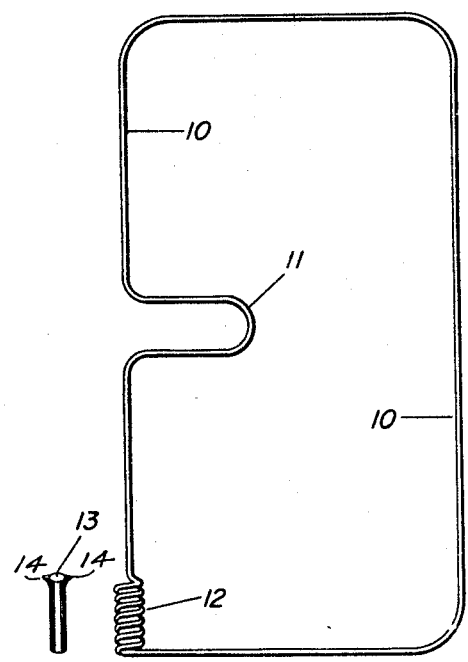
Figure 1 is an elevation of one embodiment of our invention.

In these drawings, 10 designates an endless wire loop having a bifurcation 11 for the purpose of attaching the loop 10 to a transmission line support. The loop 10 includes a multi-turn helix 12 and within said helix 12 is removably mounted a magnetic link 13 preferably made of cobalt steel in an insulating case having suitable means for supporting the link 13 within the coil 12 as by a plurality of ears or extrusions 14.

Figure 2:
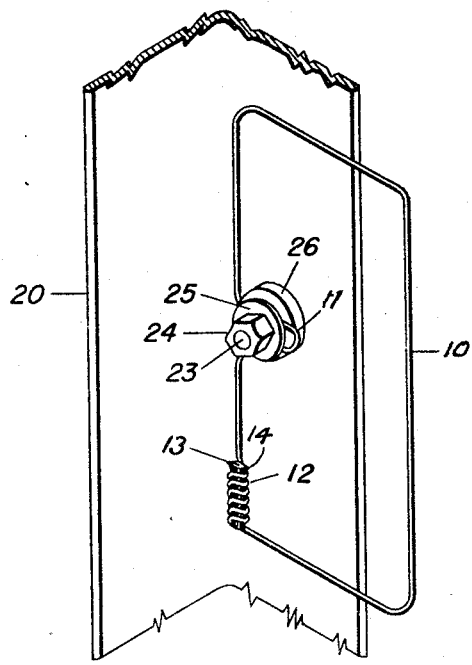
Figure 2 is a perspective detail illustrating a preferred means for mounting our device on a tower leg.

In Figure 2 a means for mounting our loop 10 on a tower leg 20 comprises a suitable headed bolt 23, a nut 24, a washer 25 and a spacing washer 26, the headed bolt 23 having been inserted through a bolt hole in the tower leg 20.

Figure 3:
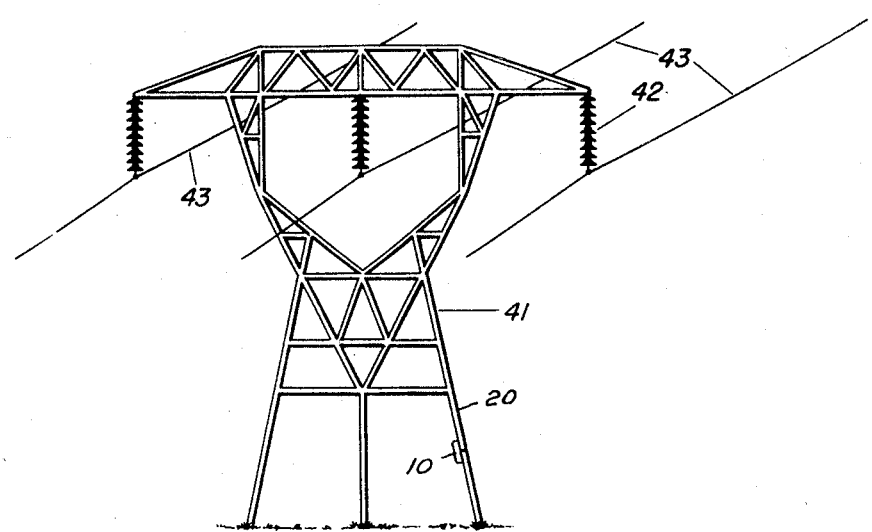
Figure 3 is a view of a transmission line with a tower equipped with one of our devices.

In Figure 3 there is diagrammatically shown a conventional transmission line supporting tower 41 provided with three ceramic insulator strings 42 each supporting a transmission line conductor 43. To a leg of the tower 41 one of the devices is bolted with a portion of the loop 10 protruding in the direction of a companion tower leg.

When lightning strikes one of the transmission lines 43 it may follow the line to one of several transmission line towers 41, flash over a supporting insulator string 42 and follow the metallic members of the tower 41 and the tower supporting legs 20 to the ground.

A single device is attached to one leg 20 of each tower 41, it being assumed that the lightning will divide among the plurality of tower legs. The passage of a flash of lightning through a leg 20 will induce a current in our loop 10 and the coils of our helix 12, and this current surge will permanently magnetize the link 13. Thereafter a lineman may quickly determine whether or not a flashover has passed through the supporting tower 41 by removing the link 13 and holding it near a compass or by employing any other means for indicating that the link 13 has been magnetized. Whenever he finds a magnetized link he makes a detailed inspection to determine what damage may have occurred to the insulators, tower or conductors. Such damage may then be repaired with a minimum loss of time in the restoration of service or the prevention of possible future outages on important high revenue transmission lines. He replaces the link with one which has been de-magnetized.

In one embodiment of our invention our loop 10 is made of number nine iron wire approximately seven inches by thirteen inches, while our helix 12 has seven turns of a mean diameter of one-half inch. The inductance of the helix is approximately 0.15 microhenry, the impedance at 60 cycles approximately 0.14 ohm, while at 25 cycles it is approximately 0.06 ohm, within the tolerance of construction precision of the loop now in use. The inductance has shown no peaking effect at frequencies up to five megacycles, which is generally accepted to be equivalent to the rate of rise of the more severe lighting surges.

It should be understood that the present disclosure is for the purpose of illustration only, and that the invention includes all modifications and equivalents which fall within the spirit and scope of the appended claims, in which it is our intention to claim all novelty inherent in our invention as broadly as possible in view of the prior art.

What we claim is:

1. A supporting structure for a transmission line in combination with a lightning flashover detection device comprising a closed loop including a multi-turn helix of material of fair electrical conductivity, and a magnetizable link replacably supported in said helix.

2. A flashover detector comprising a magnetizable link, a holder comprising a closed loop including an integral helix having a degree of conductivity such that induced lightning currents will magnetize a permanently magnetizable link within said helix but will not magnetize said link by power currents.

3. A flashover detector adapted to be mounted in operative position on an electrical transmission line support comprising a closed loop with a helical element formed therein and a removable magnetizable element adapted to be mounted within the helical element and to be magnetized when current is induced in the loop by surges of lightning through said support to enable an inspector to ascertain by means of the magnetizable element whether or not a lightning flashover might have affected some parts of a transmission line in that vicinity.

ALLEN L. KINYON.
WILLIAM E. SCARBOROUGH.

REFERENCES CITED

The following references are of record in the file of this patent:

UNITED STATES PATENTS

| Number | Name | Date |
|---|---|---|
| 1,681,560 | Tatz | Aug. 21, 1928 |
| 1,942,384 | Foust | Jan. 2, 1934 |
| 2,236,277 | Sturtevant | Mar. 25, 1941 |